United States Patent
Goto et al.

(10) Patent No.: US 11,463,897 B2
(45) Date of Patent: Oct. 4, 2022

(54) MOBILE TERMINAL TESTING APPARATUS AND TESTING METHOD

(71) Applicant: ANRITSU CORPORATION, Kanagawa (JP)

(72) Inventors: Kenji Goto, Kanagawa (JP); Takayuki Awano, Kanagawa (JP)

(73) Assignee: ANRITSU CORPORATION, Kanagawa (JP)

(*) Notice: Subject to any disclaimer, the term of this patent is extended or adjusted under 35 U.S.C. 154(b) by 0 days.

(21) Appl. No.: 17/204,009

(22) Filed: Mar. 17, 2021

(65) Prior Publication Data
US 2021/0297879 A1    Sep. 23, 2021

(30) Foreign Application Priority Data

Mar. 23, 2020  (JP) .............................. JP2020-051842

(51) Int. Cl.
*H04W 24/08*    (2009.01)

(52) U.S. Cl.
CPC .................................... *H04W 24/08* (2013.01)

(58) Field of Classification Search
CPC ........................................................ H04L 5/001
See application file for complete search history.

(56) References Cited

U.S. PATENT DOCUMENTS

| | | | |
|---|---|---|---|
| 2014/0029440 A1 | 1/2014 | Genoud et al. | |
| 2014/0126403 A1* | 5/2014 | Siomina .............. | H04W 52/244 370/252 |
| 2017/0099609 A1 | 4/2017 | Awano et al. | |

FOREIGN PATENT DOCUMENTS

| | | |
|---|---|---|
| JP | 2014-027656 A | 2/2014 |
| JP | 6262182 B2 | 1/2018 |

OTHER PUBLICATIONS

3rd Generation Partnership Project; Technical Specification Group Radio Access Network; Evolved Universal Terrestrial Radio Access (E-UTRA); User Equipment (UE) radio transmission and reception (Release 16), 3GPP TS 36.101 16.4.0, Jan. 12, 2020, pp. 327-329.
Ericsson, ST-Ericsson, TP for TR36.807: EVM and in-band emission [online], 3GPP TSG RAN WG4 adhoc_R4_AH#03_Bratislava_June_2010_R4-102732, Internet <URL:http://www.3gpp.org/ftp/tsg_ran/WG4_Radio/TSGR4_AHs/R4_AH#03_Bratis lava_June_2010/Documents/R4-102732.zip>, Jul. 2, 2010.

* cited by examiner

*Primary Examiner* — Kevin Kim
(74) *Attorney, Agent, or Firm* — Pearne & Gordon LLP (57) ABSTRACT

An object of the present invention is to provide a mobile terminal testing apparatus capable of improving operability. A mobile terminal testing apparatus according to the present invention is a mobile terminal testing apparatus (1) which uses one of a plurality of component carriers in carrier aggregation as a primary component carrier and the other component carriers as secondary component carriers, and makes a call connection with a mobile terminal (2) to test the carrier aggregation, the mobile terminal has a local oscillation frequency in a continuous frequency band from the primary component carrier to the secondary component carriers, and the input unit (15) collectively sets the desired parameters for the continuous frequency band.

4 Claims, 4 Drawing Sheets

MOBILE TERMINAL TESTING APPARATUS AND TESTING METHOD

TECHNICAL FIELD

The present invention relates to a mobile terminal testing apparatus which tests a mobile terminal.

BACKGROUND ART

In a case of developing a mobile terminal such as a mobile phone or a data communication terminal, it is necessary to test whether or not the developed mobile terminal can normally perform communication. Therefore, a testing apparatus which operates as a pseudo base station simulating a function of an actual base station is connected to a mobile terminal to be tested, performs communication with the mobile terminal, and performs a test of checking the contents of the communication.

In addition, in 3rd Generation Partnership Project (3GPP) which creates a standard for wireless communication, a Carrier Aggregation technology is introduced in the Long Term Evolution-Advanced (LTE-A) standard. This carrier aggregation aims to improve the transmission speed, by performing communication by using a plurality of LTE carriers at the same time.

In carrier aggregation, communication is performed using a plurality of LTE carriers called component carriers (hereinafter, also referred to as CCs), and carrier aggregation is classified into three CAs depending on the frequency arrangement of each CC: Intra-band contiguous CA (carrier aggregation by a plurality of CCs having a contiguous frequency arrangement), Intra-band non-contiguous CA (carrier aggregation by a plurality of CCs with non-contiguous frequency arrangements in the same frequency band), and Inter-band CA (carrier aggregation by a plurality of CCs having a non-contiguous frequency arrangement in different frequency bands).

In carrier aggregation, communication is performed by one primary component carrier (hereinafter, also referred to as PCC) which is a CC required for a mobile terminal to maintain a connection with a base station, and one or more secondary component carriers (hereinafter, also referred to as SCC) which are CCs used to improve the transmission speed between the mobile terminal and the base station.

Patent Document 1 describes a testing apparatus capable of performing a carrier aggregation test.

In the 3GPP Release 10 and subsequent standards, the carrier aggregation technology is also applied to uplinks (links from mobile terminals to base stations).

The 3GPP standard defines the measurement items of the transmission signal of the mobile terminal, and in the measurement items of the Intra-band contiguous CA below, unless the testing apparatus knows the frequency of the local oscillator (hereinafter, referred to as "LO frequency") of the mobile terminal, accurate measurement cannot be performed.

Error Vector Magnitude (EVM) for CA (TS36.521-16.5.2A.1)
Carrier leakage for CA (T536.521-16.5.2A.2)
In-band emissions for non-allocated RB for CA (TS36.521-16.5.2A.3)

Since the LO frequency depends on the specifications and hardware configuration of the mobile terminal, in the testing apparatus proposed in Patent Document 1, unless the user of the testing apparatus knows the specifications and hardware configuration of the mobile terminal, the LO frequency is unknown and accurate measurement cannot be performed.

Therefore, Patent Document 2 discloses a mobile terminal testing apparatus capable of knowing the LO frequency of a mobile terminal and accurately measuring a transmission signal, without knowing the specifications and hardware configuration of the mobile terminal.

RELATED ART DOCUMENT

Patent Document

[Patent Document 1] JP-A-2014-27656
[Patent Document 2] Japanese Patent No. 6262182

DISCLOSURE OF THE INVENTION

Problem that the Invention is to Solve

However, the mobile terminal testing apparatus of Patent Document 2 has the following problems.

When In-Band Emission (IBE) measurement for uplink carrier aggregation is performed, if one LO frequency is at the center of a continuous frequency band over all CCs, the CC in which "Carrier leakage" and "Image" can be acquired changes depending on the frequency of the transmission signal output by the mobile terminal and the carrier aggregation conditions. Further, the result of "General" is different between the CC with the transmission signal and the CC without the transmission signal.

Figure 4A:
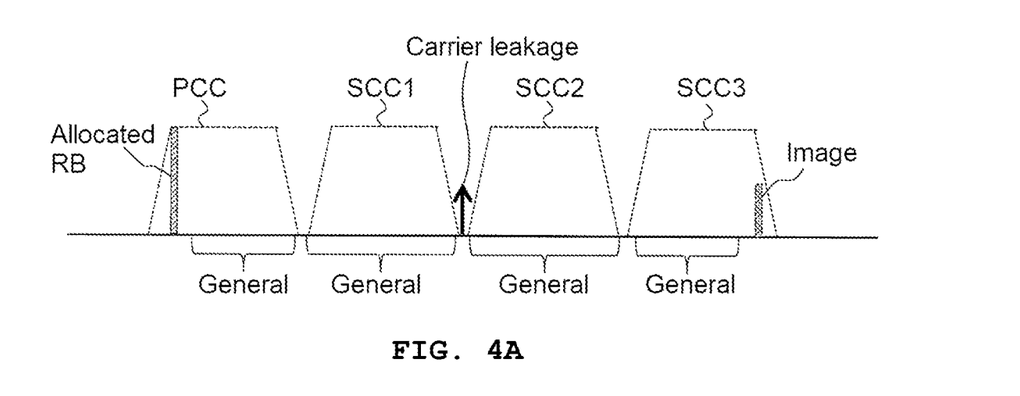
FIGS. 4A, 4B, and 4C are diagrams illustrating conditions for carrier aggregation.

For example, under the carrier aggregation condition as shown in FIG. 4A, when the frequency (Allocated RB) of the transmission signal is in the PCC, "Image" is acquired in the SCC3. Since the LO frequency is between CCs under this condition, "Carrier leakage" cannot be measured and needs to be acquired by another method.

Figure 4B:
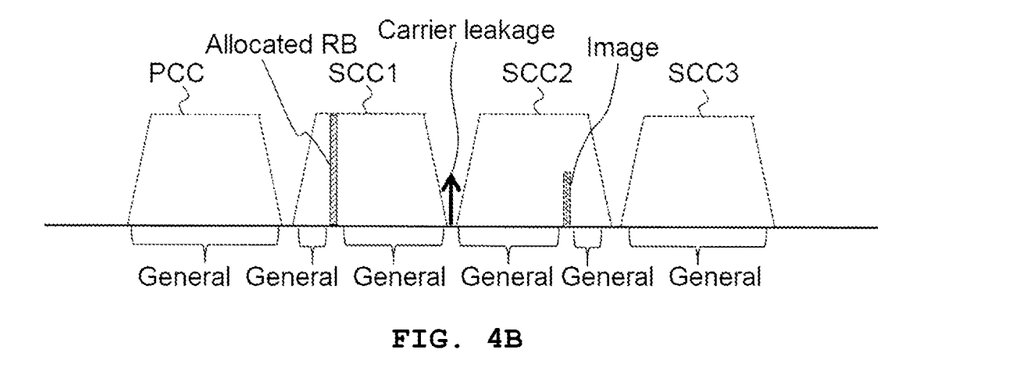

Further, under the carrier aggregation condition as shown in FIG. 4B, when the frequency (Allocated RB) of the transmission signal is in the SCC1, "Image" is acquired in the SCC2. Since the LO frequency is between CCs even under this condition, "Carrier leakage" cannot be measured and needs to be acquired by another method.

Figure 4C:
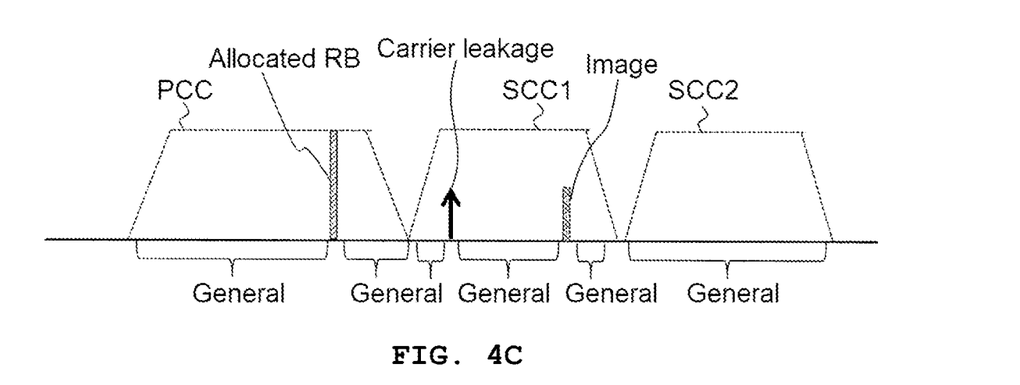

Further, under the carrier aggregation condition as shown in FIG. 4C, when the frequency (Allocated RB) of the transmission signal is in the PCC, "Carrier leakage" and "Image" are acquired in the SCC1.

Further, with respect to "General", the positions of the frequencies that can be acquired in each of FIGS. 4A, 4B, and 4C are changed.

That is, when trying to test carrier aggregation, it is necessary to set parameters for each CC in the mobile terminal testing apparatus in order to check the measurement result for each CC. That is, as the number of CCs increases, the number of command input operations by the operator increases. Therefore, the mobile terminal testing apparatus of Patent Document 2 has a problem that the operability is not good.

Therefore, an object of the present invention is to provide a mobile terminal testing apparatus capable of improving operability, in order to solve the above problems.

Means for Solving the Problem

In order to achieve the above object, a mobile terminal testing apparatus according to the present invention enables input of a command for batch measurement capable of testing a transmission signal from a mobile terminal over a continuous frequency band including all CCs.

Specifically, a mobile terminal testing apparatus according to claim 1 of the present invention is a mobile terminal testing apparatus (1) which uses one of a plurality of component carriers in carrier aggregation as a primary component carrier and the other component carriers as secondary component carriers, and makes a call connection with a mobile terminal (2) to test the carrier aggregation, the apparatus including: a call processing unit (12) that performs call control for the mobile terminal, and controls transmission conditions of a transmission signal of the mobile terminal; a reception unit (13) that receives a signal satisfying a predetermined transmission condition from the mobile terminal; a detection unit (14) that collectively detects a plurality of parameters related to carrier aggregation corresponding to a batch measurement command, for a continuous frequency band over the plurality of component carriers, from the signal received by the reception unit; and a user interface unit (17) including an input unit (15) into which the batch measurement command is input, and a display unit (16) that displays a detection result of the plurality of parameters detected by the detection unit in response to the batch measurement command.

The mobile terminal testing apparatus can accept a batch measurement command for collectively detecting a plurality of parameters for a continuous frequency band over a plurality of component carriers. Therefore, the operator only needs to input the batch measurement command to the mobile terminal testing apparatus, and does not need to input the command for each CC. Therefore, the present invention can provide a mobile terminal testing apparatus capable of improving operability.

Further, in the mobile terminal testing apparatus according to claim 2 of the present invention, the plurality of the parameters include, for In band emission (IBE) measurement, power of a frequency of the transmission signal (Allocated RB (allocated CC)), power of a frequency other than the frequency of the transmission signal (General (non-allocated CC)), power of a local oscillation frequency of the mobile terminal (Carrier leakage), and power of a frequency of an image (Image).

The mobile terminal testing apparatus according to claim 3 of the present invention further includes a control unit (18), in which when the batch measurement command is input to the input unit, the control unit determines the number of local oscillation frequencies over the continuous frequency band, through the call processing unit, when the number of the local oscillation frequencies is one, the control unit instructs the call processing unit to output the transmission signal to the mobile terminal at one or a plurality of frequencies of the primary component carrier, and instructs the detection unit to detect the power of the frequency of the transmission signal, the power of the frequency other than the frequency of the transmission signal, and the power of the frequency of the image, and when the number of local oscillation frequencies is more than one, the control unit instructs the call processing unit to output the transmission signal to the mobile terminal at one or a plurality of frequencies for each component carrier, and instructs the detection unit to detect the power of the frequency of the transmission signal, the power of the frequency other than the frequency of the transmission signal, and the power of the frequency of the image, for each component carrier.

This mobile terminal testing apparatus can perform IBE measurement over a continuous frequency band including all CCs, by such a batch measurement command, regardless of the specifications and hardware configuration of the mobile terminal.

In the mobile terminal testing apparatus according to claim 4 of the present invention, when the number of the local oscillation frequencies is one and the local oscillation frequency is included in any of the component carriers, the control unit instructs the detection unit to further detect power of the local oscillation frequency of the mobile terminal.

When the LO frequency is included in the CC, the mobile terminal testing apparatus can also measure the power (Carrier leakage) of the local oscillation frequency.

A mobile terminal testing method according to claim 5 of the present invention is a mobile terminal testing method in which one of a plurality of component carriers in carrier aggregation is used as a primary component carrier and the other component carrier is used as a secondary component carrier to make a call connection with a mobile terminal to test the carrier aggregation, the method including: a step of performing call control for the mobile terminal and controlling transmission conditions of a transmission signal of the mobile terminal; a step of receiving a signal satisfying a predetermined transmission condition from the mobile terminal; a step of collectively detecting a plurality of parameters related to carrier aggregation corresponding to a batch measurement command, for a continuous frequency band over the plurality of component carriers, from the received signal; a step of receiving the batch measurement command to be input; and a step of displaying a detection result of the plurality of parameters detected in response to the batch measurement command.

The above inventions can be combined as much as possible.

Advantage of the Invention

The present invention can provide a mobile terminal testing apparatus capable of improving operability.

BEST MODE FOR CARRYING OUT THE INVENTION

Hereinafter, an embodiment of the present invention will be described with reference to the drawings. The embodiment described below is an example of the present invention, and the present invention is not limited to the following embodiment. In this specification and the drawings, constituent elements having the same reference signs are assumed to be the same.

Figure 1:
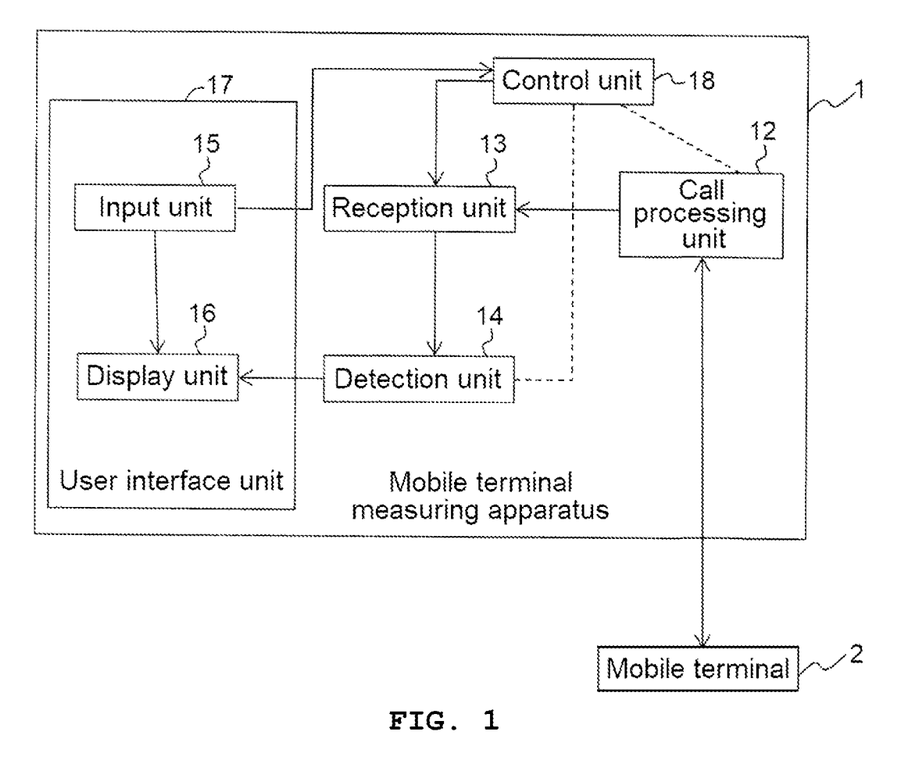
FIG. 1 is a functional block diagram illustrating a mobile terminal testing apparatus according to the present invention.

FIG. 1 is a functional block diagram illustrating a mobile terminal testing apparatus 1 of the present embodiment. The mobile terminal testing apparatus 1 as a pseudo base station is configured to transmit and receive wireless signals to and from a mobile terminal 2 by wire via a coaxial cable or the like. Further, the mobile terminal testing apparatus 1 may wirelessly transmit and receive signals to and from the mobile terminal 2 via an antenna. The mobile terminal testing apparatus 1 is compatible with LTE-A and 5G NR standards (after described as NR), and can communicate with the mobile terminal 2 by carrier aggregation technology.

The mobile terminal testing apparatus 1 includes a call processing unit 12, a reception unit 13, a detection unit 14, a user interface unit 17, and a control unit 18. The mobile terminal testing apparatus 1 uses one of a plurality of component carriers in carrier aggregation as a primary component carrier, and uses the other component carrier is used as a secondary component carrier to make a call connection with a mobile terminal 2 to test the carrier aggregation.

The mobile terminal testing apparatus 1 generates and transmits an electrical signal (wireless signal in the case of wireless communication) by encoding, modulating, frequency-converting, or the like the transmission data of the call processing unit 12. Further, the mobile terminal testing apparatus 1 performs frequency conversion, demodulation, decoding, or the like on the received signal received from the mobile terminal 2, and outputs the processed signal to the call processing unit 12.

The call processing unit 12 transmits an electrical signal (wireless signal in the case of wireless communication) that satisfies the test conditions, to the mobile terminal 2, according to the parameters of the component carrier, such as the frequency and the multiplexing method set according to the test condition. Further, the call processing unit 12 transmits and receives an electrical signal (wireless signal in the case of wireless communication) to and from the mobile terminal 2, and makes a call connection with the mobile terminal 2, that satisfies the test conditions as component carriers, or performs call control as component carriers corresponding to the test conditions.

The reception unit 13 is connected to the call processing unit 12, and among the signals transmitted and received to and from the mobile terminal 2 by the call processing unit 12, receives a transmission signal that satisfies a predetermined transmission condition transmitted by the mobile terminal 2. The predetermined transmission condition is, for example, a condition for transmitting a signal for IBE measurement (Allocated RB, General, Image, Carrier leakage). Specifically, when performing IBE measurement in the 3GPP test standard, (a) A signal allocated by 1 RB is transmitted to the Lowest (lower frequency) on the PCC side.

(b) A signal allocated by 1 RB is transmitted to the Highest (higher frequency) on the PCC side.

The test is performed under the following two transmission conditions.

The detection unit 14 detects parameters related to carrier aggregation, from the transmission signal received by the reception unit 13. For example, the parameter includes, for measure of in band emission (IBE), power of the frequency of the transmission signal (Allocated RB (allocated CC)), power of a frequency other than the frequency of the transmission signal (General (non-allocated CC)), power of a local oscillation frequency of the mobile terminal (Carrier leakage), and power of the frequency of an image (Image).

The user interface unit 17 includes an input unit 15 that receives an operation input from the user, and a display unit 16 that displays a CC parameter setting screen and a detection result of the detection unit 14. The input unit 15 includes a touch pad, a keyboard, a push button, or the like. The display unit 16 includes a liquid crystal display device or the like.

A mobile terminal measuring apparatus 1 may include a control unit 18. The control unit 18 is a computer unit including a central processing unit (CPU), a random access memory (RAM), a read only memory (ROM), a hard disk device, and an input/output port.

The ROM and the hard disk device of the computer unit store various control constants, various maps, and the like, as well as a program for causing the computer unit to function as the control unit 18. That is, the CPU executes the program stored in the ROM and the hard disk device, and the computer unit functions as the control unit 18. The control unit 18 connects to the call processing unit 12, the reception unit 13, and the user interface unit 17.

The control unit 18 notifies the call processing unit 12 of the parameters set by the input operation by the input unit 15 according to the parameter setting screen displayed on the display unit 16, and establishes the communication of the component carrier corresponding to the set parameters. Further, the control unit 18 transmits a command to the reception unit 13, based on the set parameters. The control unit 18 controls the frequency and multiplexing method of the electrical signal (wireless signal in the case of wireless communication) transmitted and received via the call processing unit 12 to cause the reception unit 13 to receive the transmission signal from the mobile terminal 2, and cause the detection unit 14 to perform the detection.

Here, in the case of the mobile terminal testing apparatus described in Patent Document 2, the operator needs to set a parameter in the input unit 15 for each CC. The mobile terminal testing apparatus described in Patent Document 2 generates commands according to set parameters. In the case of the mobile terminal testing apparatus 1 of the present embodiment, the operator can make a setting capable of collectively measuring a continuous frequency band including all CCs, in the input unit 15. With this setting, the control unit 18 generates a batch measurement command and transmits the batch measurement command to the reception unit 13, causes the mobile terminal 2 to transmit a transmission signal based on the batch measurement command, and causes the detection unit 14 to perform detection.

A specific batch measurement command will be described.

Figure 2:
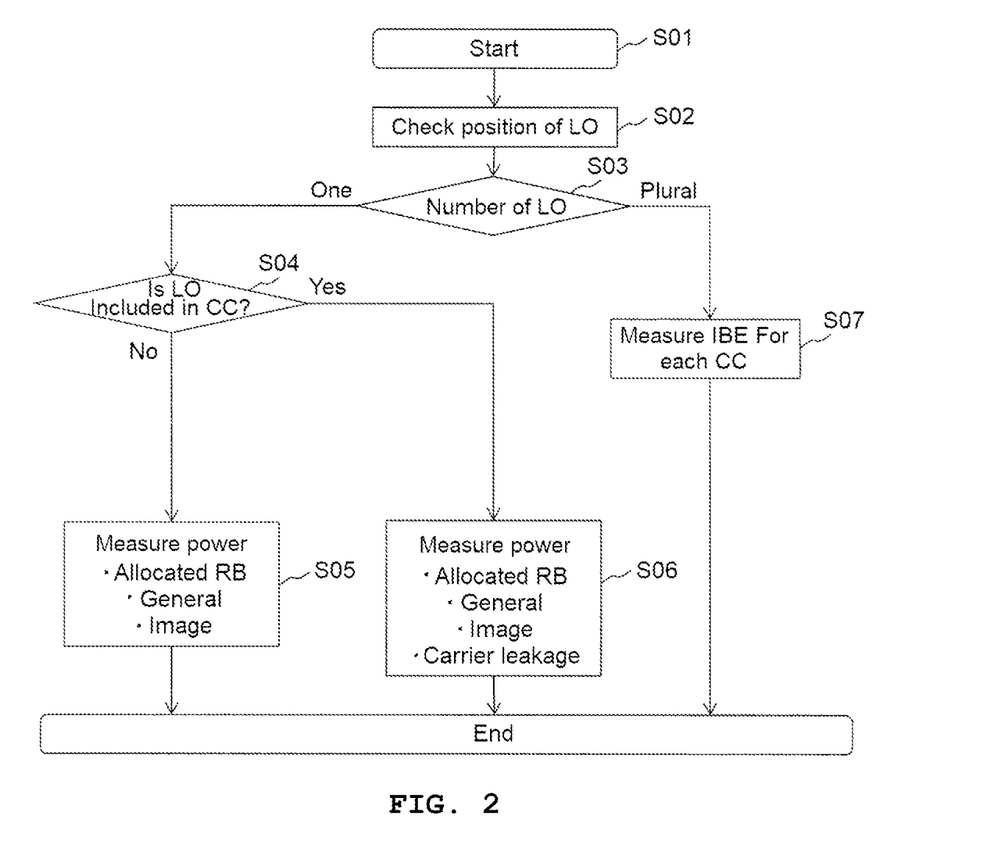
FIG. 2 is a diagram illustrating a batch measurement command prepared in the mobile terminal testing apparatus according to the present invention.

FIG. 2 is a flowchart illustrating a batch measurement command.

The batch measurement command includes determining the number of local oscillation frequencies over the continuous frequency band (step S02), when the number of the local oscillation frequencies is one, instructing the call processing unit to output the transmission signal to the mobile terminal at one or a plurality of frequencies of the primary component carrier (step S05), and instructing the detection unit to detect the power of the frequency of the transmission signal, the power of frequency other than the frequency of the transmission signal, and the power of the frequency of the image (step S06), and when the number of local oscillation frequencies is more than one, the control unit instructs the call processing unit to output the transmission signal to the mobile terminal at one or a plurality of frequencies for each component carrier, and instructing the detection unit to detect the power of the frequency of the transmission signal, the power of frequency other than the frequency of the transmission signal, and the power of the frequency of the image, for each component carrier (step S08).

When the operator sets the parameters for performing batch measurement in the input unit 15, the batch measurement command is input from the control unit 18 to the reception unit 13 (step S01). After inputting the batch measurement command, the control unit 18 first checks the LO frequency of the mobile terminal 2 via the call processing unit 12 (step S02). As a method for checking the LO frequency, for example, the method described in Patent Document 2 is exemplified.

Figure 3A:
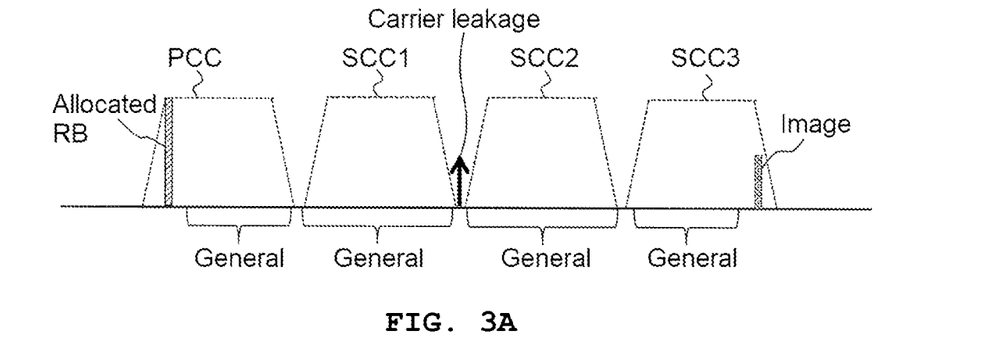
FIGS. 3A and 3B are diagrams illustrating IBE measurement performed by the mobile terminal testing apparatus according to the present invention.
Figure 3B:
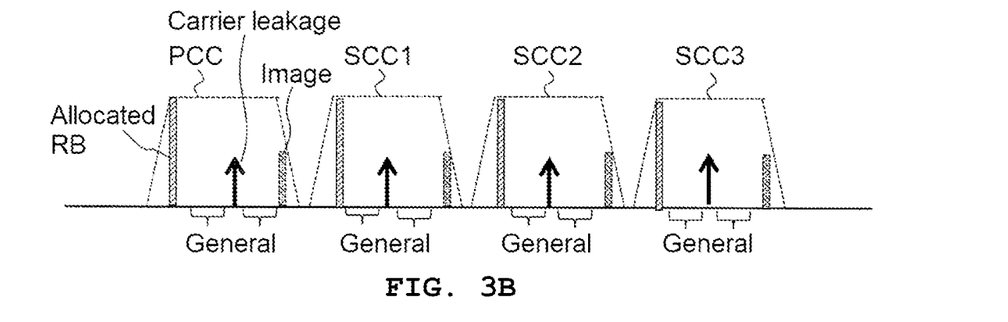

There may be one or a plurality of LO frequencies, depending on the structure of the mobile terminal 2. FIG. 3A shows an example of a frequency waveform when the LO frequency is one. The waveform of "Carrier leakage" in FIG. 3A is LO. On the other hand, FIG. 3B shows an example of a frequency waveform when there are a plurality of LO frequencies. The waveform of "Carrier leakage" in FIG. 3B is LO. In both cases, the horizontal axis is frequency and the vertical axis is power.

When there is one LO frequency and the LO frequency is not included in any of the CCs ("No" in step S04), the control unit 18 outputs a transmission signal to the mobile terminal 2. The frequency of the transmission signal is a frequency input by the operator to the input unit 15 as a parameter.

After that, the control unit 18 detects each parameter (power measurement) (step S05). In the case of FIG. 3A (when there are three SCCs), specifically, the following five types of power are measured. "Allocated RB": Power of the frequency of the transmission signal (RB: Resource Block, which may be one RB or a plurality of RBs). The frequency is known because it is a parameter input by the operator.

"Image": The power of the image generated by the transmission signal. The frequency of the image is a frequency estimated from the parameters and the LO frequency of the transmission signal input by the operator.

"General": Measure the following powers for PCC, SCC1, SCC2, and SCC3. Power of frequencies other than Allocated RB in PCC, and power of all frequencies except the frequency of the image in SCC1, SCC2, and SCC3.

In addition, when the LO frequency exists between CCs as shown in FIG. 3A, it is not possible to measure "Carrier leakage". For example, when the LO frequency is included in any of the CCs as shown in FIG. 4C ("Yes" in step S04), the mobile terminal measuring apparatus 1 outputs a transmission signal to the mobile terminal, and can measure the power of "Carrier leakage", in addition to the powers of "Allocated RB", "Image", and "General" (step S06).

On the other hand, when there are a plurality of LO frequencies, the mobile terminal measuring apparatus 1 outputs a transmission signal to the mobile terminal and performs IBE measurement for each CC (step S07). In the case of FIG. 3B (when there are three SCCs), specifically, the power is measured as follows.

First, the powers of "Allocated RB", "Image", "General" and "Carrier leakage" are measured for PCC. Subsequently, the powers of "Allocated RB", "Image", "General" and "Carrier leakage" are similarly measured even for SCC1 to SCC3.

After completing the power measurement according to the flowchart of FIG. 2, the mobile terminal measuring apparatus 1 displays the measurement result on the display unit 16. When displaying the measurement result, the worst values of "Image", "General", and "Carrier leakage" may be displayed. The worst value is a value with the maximum power among each parameter. However, when there is one LO frequency as shown in FIG. 3A, the worst value does not exist because there are one "Image" and one or unmeasurable "Carrier leakage".

Effect

Even when the number of component carriers increases, the mobile terminal measuring apparatus 1 can collectively acquire parameters for continuous frequency bands, so that the load on the operator can be reduced.

INDUSTRIAL APPLICABILITY

The mobile terminal testing apparatus of the present invention can be applied to IBE measurement of a mobile terminal that performs uplink carrier aggregation in LTE or NR.

DESCRIPTION OF REFERENCE NUMERALS AND SIGNS

1 Mobile terminal testing apparatus
2 Mobile terminal
12 Call processing unit
13 Reception unit
14 Detection unit
15 Input unit
16 Display unit
17 User interface unit
18 Control unit

What is claimed is:

1. A mobile terminal testing apparatus which uses one of a plurality of component carriers in carrier aggregation as a primary component carrier and the other component carriers as secondary component carriers, and makes a call connection with a mobile terminal to test the carrier aggregation, the apparatus comprising:
   a call processing unit that performs call control for the mobile terminal, and controls transmission conditions of a transmission signal of the mobile terminal;
   a reception unit that receives a signal satisfying a predetermined transmission condition from the mobile terminal;
   a detection unit that collectively detects a plurality of parameters related to carrier aggregation corresponding to a batch measurement command, for a continuous frequency band over the plurality of component carriers, from the signal received by the reception unit; and
   a user interface unit including an input unit into which the batch measurement command is input, and a display unit that displays a detection result of the plurality of parameters detected by the detection unit in response to the batch measurement command,
   wherein the plurality of parameters include, for In band emission (IBE) measurement, a power of a frequency of the transmission signal (Allocated RB (allocated CC)), a power of a frequency other than the frequency of the transmission signal (General (non-allocated CC)), a power of a local oscillation frequency of the mobile terminal (Carrier leakage), and a power of a frequency of an image (Image).

2. A mobile terminal testing apparatus which uses one of a plurality of component carriers in carrier aggregation as a primary component carrier and the other component carriers as secondary component carriers, and makes a call connection with a mobile terminal to test the carrier aggregation, the apparatus comprising:
- a call processing unit that performs call control for the mobile terminal, and controls transmission conditions of a transmission signal of the mobile terminal;
- a reception unit that receives a signal satisfying a predetermined transmission condition from the mobile terminal;
- a detection unit that collectively detects a plurality of parameters related to carrier aggregation corresponding to a batch measurement command, for a continuous frequency band over the plurality of component carriers, from the signal received by the reception unit;
- a user interface unit including an input unit into which the batch measurement command is input, and a display unit that displays a detection result of the plurality of parameters detected by the detection unit in response to the batch measurement command; and
- a control unit, wherein:
- the plurality of parameters include, for In band emission (IBE) measurement, a power of a frequency of the transmission signal (Allocated RB (allocated CC)), a power of a frequency other than the frequency of the transmission signal (General (non-allocated CC)), a power of a local oscillation frequency of the mobile terminal (Carrier leakage), and a power of a frequency of an image (Image),
- when the batch measurement command is input to the input unit, the control unit determines the number of local oscillation frequencies over the continuous frequency band, through the call processing unit,
- when the number of the local oscillation frequencies is one, the control unit instructs the call processing unit to output the transmission signal to the mobile terminal at one or a plurality of frequencies of the primary component carrier, and instructs the detection unit to detect the power of the frequency of the transmission signal, the power of the frequency other than the frequency of the transmission signal, and the power of the frequency of the image, and
- when the number of local oscillation frequencies is more than one, the control unit instructs the call processing unit to output the transmission signal to the mobile terminal at one or a plurality of frequencies for each component carrier, and instructs the detection unit to detect the power of the frequency of the transmission signal, the power of the frequency other than the frequency of the transmission signal, and the power of the frequency of the image, for each component carrier.

3. A mobile terminal testing apparatus which uses one of a plurality of component carriers in carrier aggregation as a primary component carrier and the other component carriers as secondary component carriers, and makes a call connection with a mobile terminal to test the carrier aggregation, the apparatus comprising:
- a call processing unit that performs call control for the mobile terminal, and controls transmission conditions of a transmission signal of the mobile terminal;
  - a reception unit that receives a signal satisfying a predetermined transmission condition from the mobile terminal;
  - a detection unit that collectively detects a plurality of parameters related to carrier aggregation corresponding to a batch measurement command, for a continuous frequency band over the plurality of component carriers, from the signal received by the reception unit; and
  - a user interface unit including an input unit into which the batch measurement command is input, and a display unit that displays a detection result of the plurality of parameters detected by the detection unit in response to the batch measurement command; and
  - a control unit, wherein:
- the plurality of parameters include, for In band emission (IBE) measurement, a power of a frequency of the transmission signal (Allocated RB (allocated CC)), a power of a frequency other than the frequency of the transmission signal (General (non-allocated CC)), a power of a local oscillation frequency of the mobile terminal (Carrier leakage), and a power of a frequency of an image (Image),
- when the batch measurement command is input to the input unit, the control unit determines the number of local oscillation frequencies over the continuous frequency band, through the call processing unit,
- when the number of the local oscillation frequencies is one, the control unit instructs the call processing unit to output the transmission signal to the mobile terminal at one or a plurality of frequencies of the primary component carrier, and instructs the detection unit to detect the power of the frequency of the transmission signal, the power of the frequency other than the frequency of the transmission signal, and the power of the frequency of the image,
- when the number of local oscillation frequencies is more than one, the control unit instructs the call processing unit to output the transmission signal to the mobile terminal at one or a plurality of frequencies for each component carrier, and instructs the detection unit to detect the power of the frequency of the transmission signal, the power of the frequency other than the frequency of the transmission signal, and the power of the frequency of the image, for each component carrier, and
- when the number of the local oscillation frequencies is one and the local oscillation frequency is included in any of the component carriers, the control unit instructs the detection unit to further detect power of the local oscillation frequency of the mobile terminal.

4. A mobile terminal testing method which uses one of a plurality of component carriers in carrier aggregation as a primary component carrier and the other component carriers as secondary component carriers, and makes a call connection with a mobile terminal to test the carrier aggregation, the method comprising:
- a step of performing call control for the mobile terminal and controlling transmission conditions of a transmission signal of the mobile terminal;
- a step of receiving a signal satisfying a predetermined transmission condition from the mobile terminal;
- a step of collectively detecting a plurality of parameters related to carrier aggregation corresponding to a batch measurement command, for a continuous frequency band over the plurality of component carriers, from the received signal;
- a step of receiving the batch measurement command to be input; and
- a step of displaying a detection result of the plurality of parameters detected in response to the batch measurement command, wherein the plurality of parameters include, for In band emission (IBE) measurement, power of a frequency of the transmission signal (Allocated RB (allocated CC)), power of a frequency other than the frequency of the transmission signal (General (non-allocated CC)), power of a local oscillation frequency of the mobile terminal (Carrier leakage), and power of a frequency of an image (Image).

\* \* \* \* \*